UNITED STATES PATENT OFFICE.

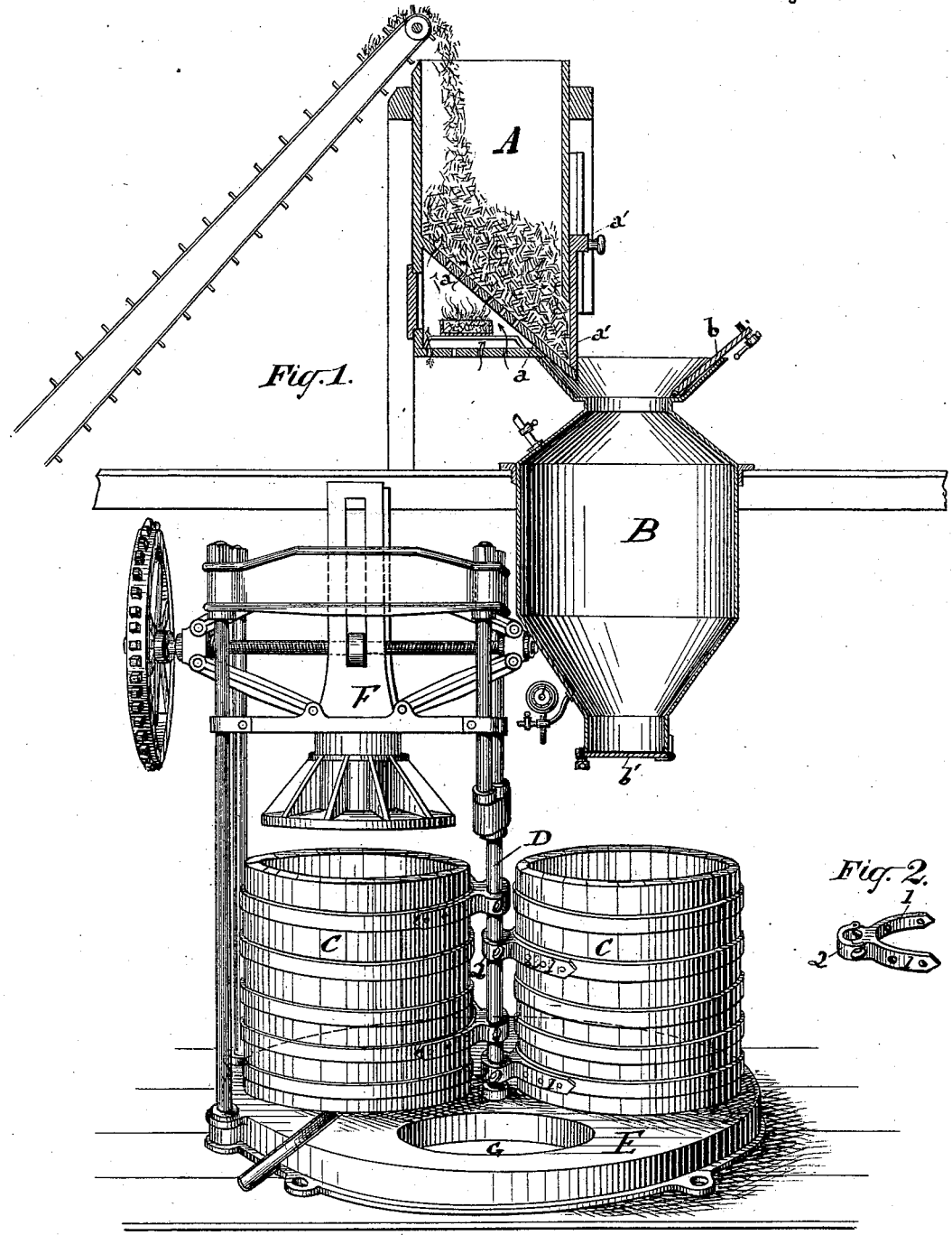

GEORGE B. BOOMER, OF MOUNT PLEASANT, WESTCHESTER COUNTY, N. Y.

APPARATUS FOR EXTRACTING CANE-JUICE.

SPECIFICATION forming part of Letters Patent No. 298,165, dated May 6, 1884.

Application filed February 8, 1884. (No model.)

*To all whom it may concern:*

Be it known that I, GEORGE B. BOOMER, of Tarrytown Heights, Mount Pleasant, Westchester county, State of New York, have invented a new and useful Improvement in an Apparatus for Extracting Cane-Juice, of which the following is a full, clear, and exact description, reference being had to the accompanying drawings, making a part of this specification.

This invention is an improvement upon that which was patented to me by Letters Patent No. 269,628, dated December 26, 1882.

My invention consists in the combination and arrangement of apparatus, substantially as hereinafter described, by means of which a larger percentage of juice is extracted from sugar-cane than by the methods heretofore in common use, and the juice thus obtained is clear and free from impurities.

Figure 1 shows the apparatus, except the cutter, in position ready for use. Fig. 2 is a detached view of the casting and strap.

Like letters indicate the same parts of the apparatus.

The apparatus is designed, first, to cut the cane into short lengths; second, to automatically convey such material to a receiving box or chamber placed at the top of the apparatus; third, to charge or submit the same to the action of sulphurous-acid gas; fourth, to transfer such material so charged to a close tank, in which it is subjected to the action of steam of sufficient temperature and for a sufficient time to burst the cellular tissue and liberate the juice, and also to dissolve or render liquid any crystals or condensed juice in the cane; fifth, to discharge the mass into a hoop or vessel, where it is at once pressed, and the juice thereby extracted; sixth, to discharge the bagasse from the hoops and to continually repeat the operation without the necessity of lifting or handling the cane, except to put it into the cutter.

The cutter, which may be of any desired form and size, is not shown in the drawings, but is preferably placed upon the ground-floor, level with the ground, so that the cane can be carted directly to it. This is operated by any convenient power—steam or animal—and by it the cane is cut in pieces of any desired length, preferably about half an inch.

The receiving-vessel A, into which the cut cane is discharged, is placed in the upper part of a building, or elevated upon suitable framework, and is made with closed sides and bottom, but is open at the top to receive the cane as fast as it is cut.

Extending from the cutter to the receiving-vessel A is an elevator or endless belt, of any suitable construction, which is moved continuously or intermittingly by any sufficient mechanism, and which carries up the cane as fast as it is cut and discharges it into the vessel A. The inner bottom of this vessel, or that which supports the cut cane, is made inclined, as shown at $a$, so that the cut cane will discharge itself whenever the door $a'$, placed on one side at bottom, is lifted or opened. The emptying of the vessel A is thus effected by gravity, and requires no manual labor, except to open the door $a'$. The bottom $a$ is also slatted or filled with openings, preferably the former, so as to readily admit into the vessel and among the cut cane sulphurous-acid gas, which is effective in retarding or preventing fermentation in the cut cane or juice. This gas is conveniently and cheaply produced by burning brimstone in a suitable vessel—as an old kettle or spider—inclosed in the chamber A under the inclined bottom. The fumes of the burning brimstone naturally rise and pass through and pervade the whole mass of cut cane and escape from the top and pass off without incommoding the operatives.

Immediately below the receiving-chamber A is placed the steaming tank or vessel B, which is made of iron, and of sufficient strength to stand a pressure of forty to fifty pounds to the square inch. This tank is constructed with taper ends, as shown in the drawings, and has doors $b\ b'$ at its top and bottom, which shut steam-tight and are fastened by screw-bolts, or in any suitable manner. The upper end above the top door is funnel-shaped, or a detachable funnel may be there inserted to guide or direct the cut cane into the vessel B when the door $a'$ in A and the upper door, $b$, in B are opened. The vessel B is so placed and supported with reference to the vessel A that when the doors $a'$ and $b$ are opened the contents of A will pass into B by gravity, and without the necessity of transferring by handpower the material from the former to the latter. After the contents of A have been discharged into B, steam is admitted into B until a pressure of about twenty pounds is reached. It is then instantly turned off and the vessel allowed to stand five or six minutes, when the pressure falls to six or eight pounds, by which time the cane will become thoroughly saturated with the steam and softened sufficiently for its pressure. The steam is preferably admitted near the bottom of the tank, and to determine its pressure a steam-gage is inserted in the steam-pipe between the tank and the shut-off cock. A pipe with valve-cock is also fixed near the top of the tank to allow of the discharge of the steam when the tank is to be discharged.

Arranged below the steaming-vessel B are two hoops or tubs, C C, arranged to swing on the standard D, and around which they can move in a circle. These tubs or hoops are open both top and bottom, and rest on the platforms E, upon which they move or slide as they are revolved around the standard D. They are so arranged in respect to the steaming-tank B and the press F, used to extract the juice from the cane, that when one tub is under the press receiving the pressure the other is free to swing over the opening G in the platform to discharge the pressed cane, or under the tank B to receive another charge. The hoops or tubs C C move or swing independently of each other, so that as one is receiving pressure the other can be moved over the opening G and discharged, and then under the steaming-tank, to be again filled.

A convenient mode of connecting the tubs to the standard B is by means of a concave casting, 1, bolted to the hoops of the tubs, and a wrought-iron strap, 2, encircling the standard and connecting with the piece 1 by a thumb-screw, or otherwise.

To discharge the steamed cane from the tank B, it is only necessary to open the door $b'$ in the latter, when the cane will discharge itself, without handling, into the tub C under it. The discharge having been effected, the door $b'$ is closed and the tank B is ready to receive another charge. The tub C, having been filled, is turned around upon the platform E under the press F, the gearing of which is immediately put in operation to run the press down. The tub C, having previously been swung out from under the press, is discharged of its contents through the opening G in the platform E, and then moved under the tank B, to be refilled. The capacity of the tank B should be about the same as that of the chamber A; but the capacity of tubs C C may be somewhat smaller, as the steaming of the cane will reduce to some degree its bulk.

Experience has shown that the vessel A should be capable of holding about one thousand pounds, as this quantity of material can be readily steamed and pressed. With vessels of such capacity a charge can be cut, steamed, and pressed about every ten minutes.

Any desired press may be used to press the juice from the steamed cane; but it should be one which can give a pressure of from twenty to forty pounds to the square foot. I prefer the press illustrated in the drawings, as it is cheap, compact, and capable of being rapidly operated and exerting great power.

From the above description of the construction, arrangement, and operation of the apparatus, it will be seen that all handling of material, except to put it in the cutter, is unnecessary, the whole operation being, so to speak, automatic.

The pressed cane or bagasse is capable of being used at once for fuel to evaporate the juice and to furnish power for operating the machinery.

If desired, for economical or other reasons, two steaming-tanks may be used, and with one or with two presses. These can be alternately charged from the vessel A, and the steam, after it has been used in one tank, can be discharged into the other, instead of into the atmosphere. Thus only a small additional quantity of steam will be required to effect the proper steaming.

What I claim is—

1. The process of extracting the juice from sugar-cane by first cutting the cane into short lengths and submitting it to the fumes of burning sulphur, then steaming in a closed tank until the cellular tissues are broken and the condensed saccharine matter is rendered liquid, then submitting it to pressure.

2. A receiver or vessel for the cut cane, having its bottom inclining downward, and at its lowest part a discharge-orifice, with a chamber under such bottom to receive a vessel of burning brimstone, said bottom being perforated or slotted to allow the sulphurous fumes to pass upward through the cut material, substantially as and for the purpose set forth.

3. In combination with the tank B and the press F, the two hoops C C, revolving about the standard D, and the platform E, having an opening through which the bagasse is discharged, substantially as and for the purpose described.

GEO. B. BOOMER.

Witnesses:
S. NELSON WHITE,
SAMUEL LEA.